United States Patent [19]

Worthen et al.

[11] 4,230,149

[45] Oct. 28, 1980

[54] FLUID FLOW REGULATING VALVE AND SYSTEM

[75] Inventors: Roger P. Worthen, Farmington Hills; Michael M. Walsh, Northville, both of Mich.

[73] Assignee: Eaton Corporation, Cleveland, Ohio

[21] Appl. No.: 908,026

[22] Filed: May 22, 1978

[51] Int. Cl.³ .............................................. F16K 17/24
[52] U.S. Cl. .................................. 137/517; 137/504; 137/855; 138/46
[58] Field of Search ............... 137/517, 521, 599, 504, 137/855, 856, 857; 138/45, 46

[56] References Cited

U.S. PATENT DOCUMENTS

| | | | |
|---|---|---|---|
| 2,010,807 | 8/1935 | Boynton | 137/517 X |
| 2,062,341 | 12/1936 | Wells | 137/517 X |
| 2,583,177 | 1/1952 | Hoekstra | 137/599 X |
| 3,057,373 | 10/1962 | Bragg | 137/521 |
| 3,380,474 | 4/1968 | Mills | 137/517 |
| 3,523,559 | 8/1970 | Gibson | 137/517 X |
| 4,031,917 | 6/1977 | De John et al. | 137/517 X |
| 4,080,993 | 3/1978 | Lind, Jr. | 137/504 |

FOREIGN PATENT DOCUMENTS 1217791 12/1959 France ...................... 137/517

Primary Examiner—William R. Cline
Attorney, Agent, or Firm—McCloskey, Wood and Lewis

[57] ABSTRACT

A fluid flow regulating valve is inserted in line with a fluid conducting medium to regulate the flow therethrough over a widely varying range of pressure differentials across the valve. The valve is constructed of a body portion having a fluid passageway therethrough terminating at one end in a land having an empirically derived, compound curved section. A compliant reed is affixed to the body portion adjacent the land and operates to press against and conform with the land in response to increasing fluid pressure differential across the reed whereby the rate of fluid flow through the valve remains substantially constant. In an alternative embodiment of the invention, a second similarly shaped land is provided adjacent the reed and opposite the other land to provide bidirectional flow control. The lands are integral portions of the body portion of the valve which is constructed of molded plastic or the like. The reed comprises thin metal shimstock or the like which has been heat staked to the body portion.

15 Claims, 9 Drawing Figures

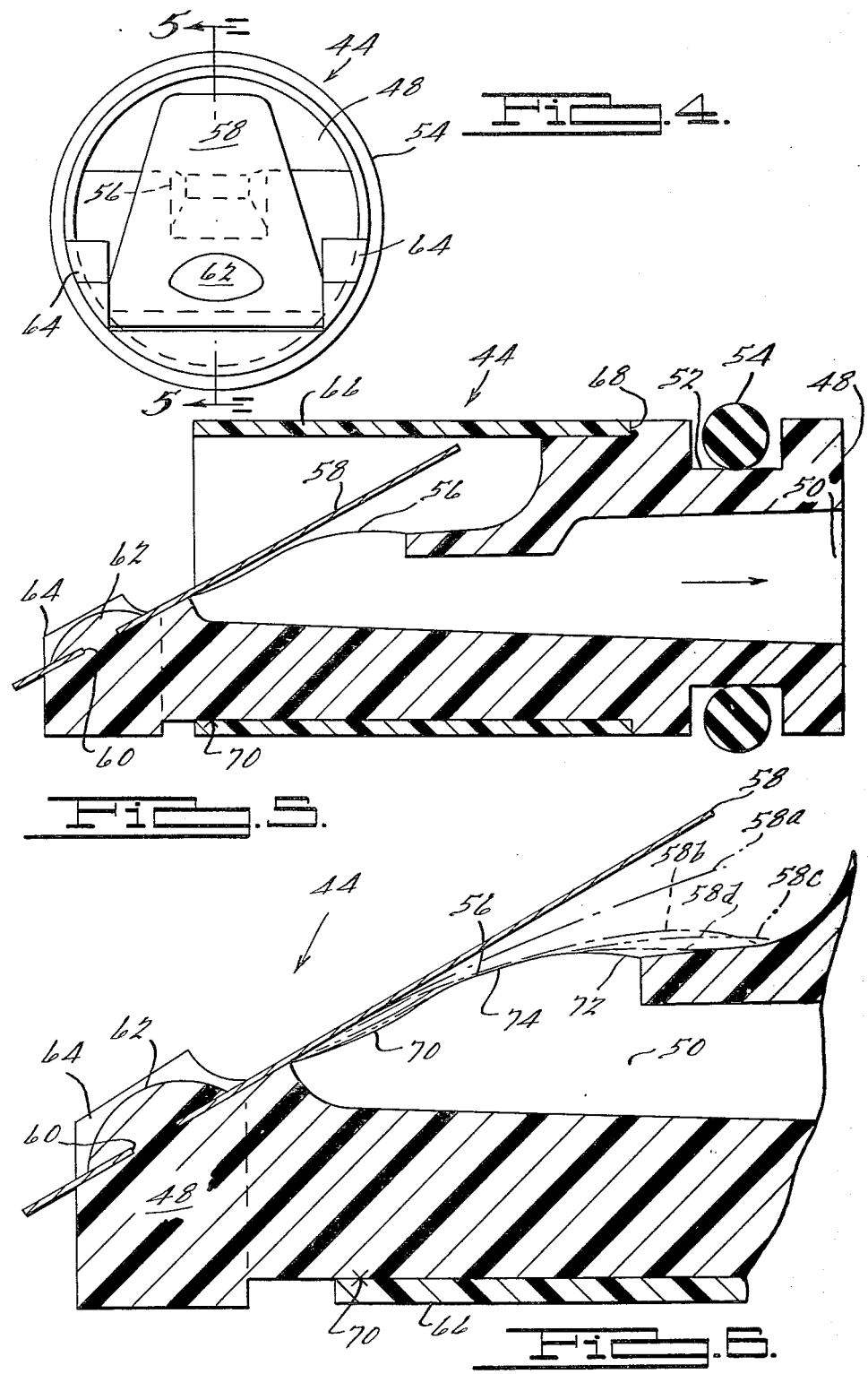

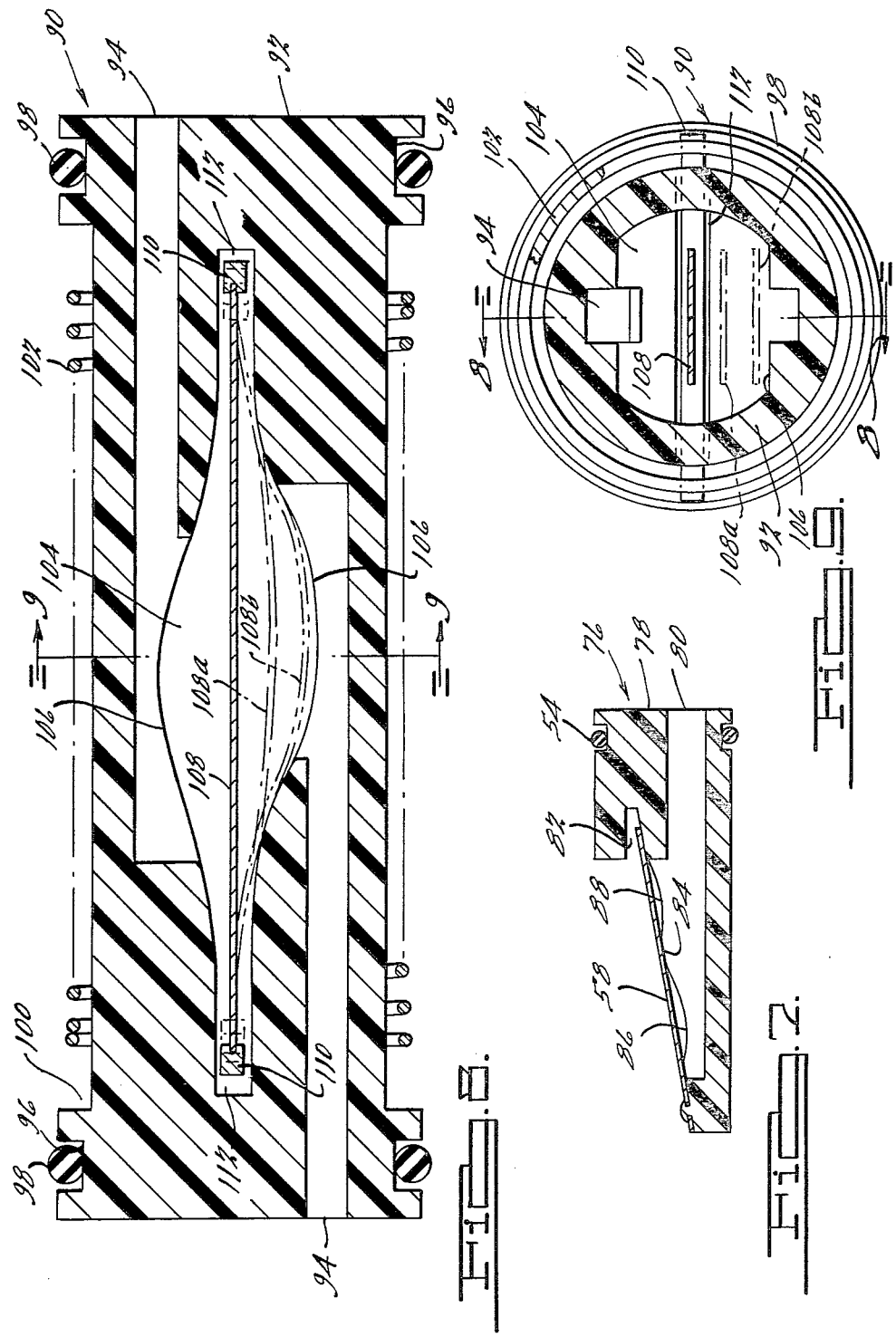

FLUID FLOW REGULATING VALVE AND SYSTEM

INTRODUCTION

This invention relates to apparatus for regulating the flow of fluid in a system and the systems within which such apparatus are implemented and specifically to such apparatus and systems which provide constant flow rates therethrough over widely varying fluid pressure differentials.

BACKGROUND OF THE INVENTION

Fluid distribution systems such as underground sprinklers, irrigation systems, building fire control networks, and the like have long used fluid flow rate devices to insure equalized pressure and flow through their several branches. The equalization of flow is particularly important in hydronic systems having headers of restricted size such as power plant condensers and solar collectors. These systems typically employ fluids at relatively high temperatures passing through pipes, conduits and the like where uniform distribution of the fluid and dissipation the heat associated therewith is important for the efficient operation of the system. Additionally, fluid distribution systems having many branches require some form of constant pressure regulation to insure that the system's fluid will reach all the branches at sufficient pressure.

Constant fluid flow regulation is typically achieved through the use of orifices and/or constant rate fluid flow valves.

Orifices, while being inexpensive, limit the system with which they are associated to a relatively small range of fluid pressure variation and tend to become partially or wholly blocked by foreign particles in the fluid.

Constant rate fluid flow valves are advantageous over orifices in that they provide a constant flow rate over varying pressure differentials. Such valves are generally inserted inline with fluid distribution systems and externally on the headers of hydronic systems. These valves typically comprise a housing with an aperture passing therethrough axially with the flow of fluid in the system. A reed is affixed to the body and covers one end of the aperture to partially block the fluid flow therethrough. The reed is typically arcuate in shape and has a carefully tailored spring constant causing it to resist the pressure applied by a pressure drop across the reed in a manner which will approximate constant fluid flow over varying pressure drops. The area in which the reed meets the opening of the aperture is typically flat and thus the flow rate characteristic of the valve is controlled solely by the spring constant of the reed. Because the spring constant must be carefully tailored, the reeds typically are of a relatively large size and must be secured to the housing by means of screws and other suitable hardware. Because of this characteristic such valves are often expensive and therefore uncompetitive in many system applications. They are also physically large and are thus suitable only for systems having relatively large flow rates.

BRIEF DESCRIPTION OF THE INVENTION

The present invention provides a fluid regulating valve which is extremely inexpensive, self-cleaning, lending itself to miniaturization and is applicable to systems having relatively low flow rates. Additionally, the present invention provides a device which employs a reed which does not require a carefully tailored spring constant and is easily manufactured. These advantages are achieved according to the present invention by the provision of a fluid flow regulating valve comprising a body portion having a fluid passageway therethrough terminating in a land having a curved section, the exact configuration of which is empirically derived. Compliant reed means are disposed adjacent the land and operate to substantially conform with the curved section in response to increasing fluid pressure across the reed whereby the rate of fluid flow through the valve remains substantially constant.

In the preferred embodiment of the invention the flow regulating valve comprises a body portion constructed of a single piece of molded material having the land integrally molded therein located substantially on a plane oblique to the direction of fluid flow. The reed is constructed of metallic foil or extremely thin shimstock which has been affixed to the body of the valve adjacent the land to operate as a cantilever. The fluid flow through the valve causes a pressure drop across the reed causing it to be displaced toward the land and gradually conform to the section of the land with increasing fluid pressure. As the reed conforms more and more closely to the shape of the land, the opening through which the fluid must pass is reduced in size thus controlling the flow rate through the valve.

The shape of the land in the preferred embodiment of the invention is a compound curve comprising a substantially concave (with respect to the oblique plane) high pressure region and a substantially convex low pressure region contiguously separated by a reed supporting region. The low pressure region tends to be closed by the reed first with increasing pressure drop across the reed thereby diverting the fluid to pass through the high pressure region of the land. As the pressure drop across the reed increases further, the high pressure region of the land is gradually closed by that portion of the reed associated therewith.

In an alternative embodiment of the invention, both the high pressure region and the low pressure region of the land are substantially concave with respect to the oblique plane.

In another alternative embodiment of the invention, reed stop means are provided to prevent substantially deflection of the reed if the valve is inadvertently placed in a reverse flow condition, thereby preventing any deformation or damage to the valve.

In still another alternative embodiment of the invention, a second land is defined by the passage through the body portion, the land being adjacent the reed but opposite the first land. In this embodiment, both ends of the reed are operatively engaged with a biasing means such as an axially disposed spring which biases the reed towards a planar configuration. As fluid flows through the valve in either direction, the reed tends to be deflected in that direction and, in cooperation with the land downstream of the reed, controls the flow rate through the valve.

Various other features and advantages of this invention will become apparent upon reading the following specification, which, along with the patent drawings, describes and discloses a preferred and illustrative embodiment of the invention in detail.

BRIEF DESCRIPTION OF THE DRAWINGS

FIG. 4 shows an end view of a fluid flow regulating valve embodying the present invention;

FIG. 5 is a longitudinal cross sectional view of the fluid flow regulating valve of FIG. 4;

FIG. 6 is a portion of the sectional view of the fluid flow regulating valve of FIG. 5 shown on an enlarged scale;

FIG. 7 is a longitudinal cross sectional view of an alternative embodiment of present invention;

FIG. 8 is a longitudinal cross sectional view of another alternative embodiment of the present invention; and FIG. 9 is a transverse cross sectional view taken on line 9—9 of FIG. 8.

DETAILED DESCRIPTION OF THE PREFERRED EMBODIMENT

Figure 1:
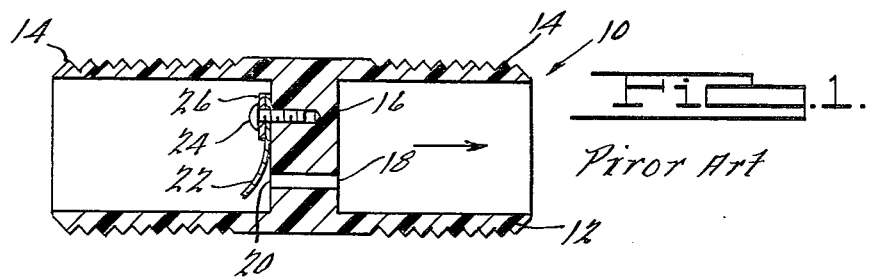
FIG. 1 illustrates a longitudinal cross sectional view of a typical prior art reed flow control valve.

Referring to FIG. 1, a typical prior art reed flow control valve 10 is illustrated, comprising a substantially cylindrical housing 12 having outer surface threads 14 at each end thereof for interconnection with a pipe or other fluid conducting means. Housing 12 is substantially closed by a central wall member or partition 16. Communication between the two ends of valve 10 through partition 16 is provided by an axially disposed bore 18. The upstream end or land 20 of bore 18 is partially covered by a flexible reed 22. Reed 22 is mounted as a cantilever to wall member 16 by means of a screw 24 and supporting washer 26. The free end of reed 22 is curved to the left away from wall member 16 and is constructed of metal or other material which will provide a determinable and highly reproducible spring constant.

As fluid flows through valve 10 (from left to right) passing through bore 18, a pressure drop across reed 22 is created thereby urging the free end of reed 22 toward land 20. All fluid passing through valve 10 must pass through bore 18 and thus, as the pressure drop across reed 22 increases, the effective area of bore 18 through which the fluid must pass decreases. The spring constant of reed 22 must be derived empirically to achieve a given desired flow characteristic.

Figure 2:
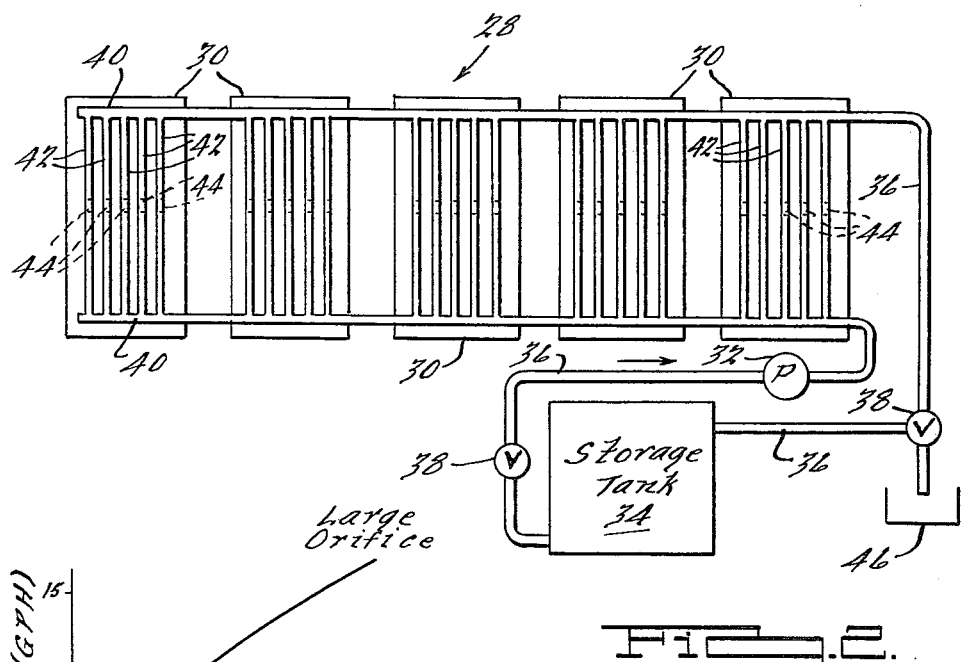
FIG. 2 illustrates a solar collector system employing a fluid flow regulating valve embodying the present invention.

Referring to FIG. 2, a fluid distribution system 28 is illustrated comprising five solar collector panels 30 collectively interconnected in series with a pump 32 and a heat storage tank 34 through fluid conducting conduit 36. Manually controlled valves 38 are provided for evacuating the system. Each solar collector 30 comprises two manifolds or headers 40 interconnected through a parallel combination of five conducting branches 42. Within each branch 42, substantially midway between the two headers 40 is disposed a fluid flow regulating valve 44. The headers 40 of each of the solar collectors 30 are connected in series whereby each of the conducting branches 40 are affectively connected in parallel. Relatively cool fluid is pumped from the lower portion of storage tank 34 through lefthandmost valve 38 by pump 32 into lower headers 40 of solar collectors 30. The fluid flows upwardly through each of the conducting branches 42 and their associated fluid flow regulating valves 44 into the upper headers 40 for return to the upper portion of storage tank 34 via conduit 36 and righthandmost valve 38. Each regulating valve 44 is calibrated to the same flow rate (5 gallons per hour in the present example). Thereby, the flow rate through each of the conducting branches 42 is uniform over varying pressure differentials as well as constant between each of the conducting branches 42. Solar energy is absorbed by the fluid as it passes through the branches 42 and thus, the temperature of the fluid in the storage tank 34 is increased. This thermal energy is removed by a secondary system (not illustrated) of the type well known in the art. Any number of different fluids could be employed in this system depending upon the system's parameters including water, glycol, or silicone. If, due to ambient temperature conditions or other factors, it is desired to drain the system 28, valves 38 are closed and pump 32 flushes the fluid into suitable drain storage means 46.

Figure 3:
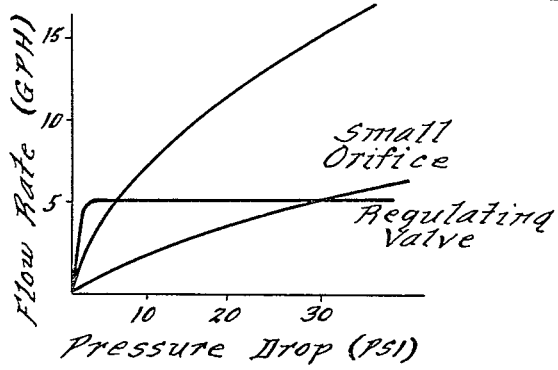
FIG. 3 is a flow rate versus pressure drop graph illustrating the operating characteristic of the invention flow regulating valve as well as that of a relatively small and a relatively large orifice.

Referring to FIG. 3 the flow rate versus drop operating characteristic of regulating valve 44 is illustrated and contrasted with those of large and small fixed orifices. If, for example, a constant flow rate of five gallons per hour were desired through each conducting branch 42, an orifice of appropriate dimension could be employed if the pressure source in the system were highly regulated and constant. However, in typical existing systems, pressure drop across the regulating valve or orifice varies substantially and thus, the use of orifices would have only limited value if efficient system operation demanded relatively constant flow rates through each of the branches 42.

Referring to FIGS. 4 and 5, the internal details of the fluid flow regulating valve 44 are illustrated. The valve 44 comprises a body portion 48 which is injection molded of plastic or other suitable material. The body portion 48 is substantially cylindrical and has a fluid passageway 50 passing substantially axially therethrough. The peripherial surface near the righthand end of valve 44 has an area of reduced diameter 52 which accommodates an O-ring 54. The outer diameter of the body portion 48 is dimensioned to closely fit within a conducting branch 42 and O-ring 54 serves to position and retain valve 44 within branch 42 with which it is associated as well as to provide a seal between the two, thereby insuring that all fluid flowing through branch 42 passes through fluid passageway 50. Although passageway 50 is illustrated as being entirely defined by body portion 48, it is contemplated that the passageway could be defined by the outer surface of body portion 48 and the inner surface of branch 42 with which it is associated. Accordingly, as used herein, 'passageway' should be broadly construed. Fluid passageway 50 terminates at the left end in a land 56 integrally formed in body portion 48 at an angle oblique to the direction of fluid flow through conducting branches 42. Land 56 has an empirically derived compound curved section. A compliant reed 58 is heat staked to body portion 48 and is cantilevered over land 56. Reed 58 is preferrably constructed of metal foil or extremely thin stainless steel shimstock having a relatively low characteristic spring constant. It is contemplated that in some application such as solar collector, it may be desirable to increase fluid flow with increasing fluid temperature to limit maximum temperature. In other applications, such as heat radiators or convectors, it may be desirable to increase fluid flow with decreasing fluid temperature. By making the reed 58 of bimetal material valve 44 can be biased open or closed. It is intended that such biasing be definitionally included in the "substantially constant" flow rate regulation of the valve for the purposes of this specification. Reed 58 is illustrated in a configuration it would assume under no fluid flow conditions. Reed 58 has an aperture 60 therein through which passes a peg 62 which is an integral part of body portion 48. Peg 62 is heat staked or mushroomed to retain reed 58 to body portion 48. Two upstanding legs 64, also integral with body portion 48 are provided to orient reed 58. It is contemplated that legs 64 could also be heat staked as an aid to retain reed 58 in its illustrated position. A substantially cylindrical guard 66 is provided to serve as a reed protector during installation and to serve as a reed stop in application should a reverse flow situation occur. Guard 66 abuts and is retained by a step 68 formed in the outer surface of body portion 48. An ultrasonic weld 70 also aids to secure guard 66 to body portion 48.

Referring to FIG. 6, an enlarged view of land 56 and reed 58 is illustrated showing the interaction between the two over varying pressure differentials. Land 56 is located substantially on a plane oblique to the direction of fluid flow and is divided into a low pressure region 70, a high pressure region 72, and an intermediate reed support region 74. Low pressure region 70 is substantially concave with respect to the oblique plane while high pressure region 72 is substantially convex. The undulating land surface defined by low pressure region 70, high pressure region 72, and intermediate reed support region 74 is contiguous, but may vary in shape substantially for various applications. Reed 58 is illustrated in solid line in the planar configuration it would assume in a substantially no flow condition. In application, fluid would be flowing from left to right and when the flow encountered reed 58, a pressure differential across reed 58 would be developed. This pressure differential would deflect reed 58 toward land 56 as illustrated in the broken line reed 58A. By way of example, the solid line reed 58 is illustrated at the no flow or zero pounds per square inch (PSI) pressure differential condition. Reed 58A is illustrated at the position it would assume at approximately 3 psi pressure drop. Reed 58B illustrates the position it would assume at approximately 5 psi at which reed 58 would contact reed support region 74 of land 56 and the uppermost portion of the free end of reed 58 would contact body portion 48. At a 5 psi pressure drop, fluid is entering fluid passage 50 through the spaces defined by reed 58B and the pressure region 70 and high pressure region 72. Reed 58C illustrates the configuration the reed 58 would assume at approximately 12 psi. The opening associated with low pressure region 70 tends to be closing at this point while high pressure region 72 remains substantially open. Accordingly, the majority of the fluid passing into fluid passageway 50 enters via high pressure region 72. Reed 58D illustrates the position the reed would assume at approximately 30 psi pressure drop. At this position low pressure region 70 is substantially closed while high pressure region 72 is partially closed. At this position most of the fluid entering the fluid passage 50 enters through high pressure region 72.

Although the exact shape of the land 56 was empirically derived to result in a characteristic as illustrated in FIG. 3, the main advantage in the present invention as opposed to the prior art is in the reproducibility of the contour as a part of body portion 48 as opposed to tailored reeds 22 found in the prior art. The preferred material in reed 58 is 0.001 inch stainless steel shimstock, but it is contemplated that other equivalent or suitable materials could by employed. The preferred embodiment of the invention results in a highly reproducible and extremely inexpensive valve which can be minaturized to a point well beyond the capability of prior art devices. As a way of example, the preferred embodiment of the invention, when applied to a solar panel which passes 5 gallons per hour through each of its branches requires a valve 44 having an outside diameter of only 0.3 inches.

Referring to FIG. 7 an alternative embodiment of the invention is illustrated. A valve 76 comprises an injection molded body 78 having a fluid passageway 80 therethrough. An O-ring 54 is provided as described in the discussion of the preferred embodiment of the invention. The reed guard 66 of the preferred embodiment is eliminated and a V-shaped reed receiving slot 82 is integrally formed in body 78. In a no flow condition reed 58, which is staked to the body 78 in a manner similar to that described in the discussion of the preferred embodiment of the invention, rests against the lowermost surface of slot 82. Additionally, reed 58 rests against a reed support region 84. Concave high and low pressure regions 88 and 86 respectively are provided which, function substantially as described in the discussion of the preferred embodiment. Because contact between reed 58 and receiving slot 82 is maintained at all flow conditions (except reverse flow), reed 58 operates as a flexible beam as opposed to a cantilever as in the preferred embodiment of the invention.

Referring to FIGS. 8 and 9, a second alternative embodiment of the present invention is illustrated. A two-way fluid flow regulating valve 90 is comprised of a body portion 92 of injection molded plastic or the like having a substantially axially disposed fluid passageway 94 passing therethrough. Areas of reduced outer diameter 96 are provided near each end of body 92 to accommodate O-rings 98. A central area of reduced diameter 100 is provided to accommodate a spring 102 which is disposed substantially coaxially with body 92. The fluid passageway 94 opens into an axially elongated central chamber 104 which defines two laterally opposed lands 106. A compliant reed 108 is disposed substantially axially within central chamber 104 and is supported at each end by a spring engaging member 110 which extends radially through the outer surface of body 92 in the area of the central reduced diameter 100. Spring 102 is compressed and abuts the innermost surfaces of spring engaging member 110 urging them axially outwardly. Spring 102 thus operates to urge reed 108 into a substantially axially orientated planar configuration. When the central portion of reed 108 is deflected in either direction by the flow of fluid through passageway 94, spring engaging members 110 are drawn inwardly further compressing spring 102. Spring engaging members 110 are axially slidably disposable in slots 112 which open into cental chamber 104.

The present alternative embodiment eliminates the chance of placing flow control valve 90 in a conducting branch backward. In application, fluid enters one end of body portion 92 through fluid passageway 94 and enters central chamber 104 creating a pressure drop across reed 108 thereby deflecting it in a downstream direction. As the pressure drop increases, reed 108 closes upon one of the lands 106 as described in the discussion of the preferred embodiment of the invention. Reed 108 is illustrated in two intermediate positions 108A and 108B illustrating its closure upon land 106. The fluid then passes into the downstream portion of fluid passageway 94 through the gap defined by reed 108 and land 106.

It is to be understood that the invention has been described with reference to specific embodiments which provide the features and advantages previously described, and that such specific embodiments are susceptible to modification, as will be apparent to those skilled in the art. Accordingly, the foregoing description is not to be construed in a limiting sense.

What is claimed is:

1. A fluid flow regulating valve comprising:
   a body portion including a fluid passageway therethrough terminating in a contoured land, said land substantially disposed on a plane at an angle of less than 45 degrees from the direction of fluid flow and comprising a low pressure region, a high pressure region and an intermediate reed supporting region; and
   compliant reed means overlaying said land and coacting therewith to maintain a substantially constant fluid flow rate through said valve, said reed means operative to progressively conform to the contours of said land with increasing pressure drop thereacross, said reed means and low pressure region defining a first, distinct flow path therebetween, and said reed means and high pressure region defining a second, distinct flow path therebetween, spaced from said first flow path by the extent of said reed supporting region, a portion of said reed means conforming with said low pressure region to effect substantial closure of said first flow path at a first, relatively low predetermined pressure drop level and another portion of said reed means conforming with said high pressure region to effect at least partial closure of said second flow path at a second, relatively high predetermined pressure drop level.

2. The flow regulating valve of claim 1, wherein said land is integrally molded in said body portion.

3. The flow regulating valve of claim 1, wherein said reed means is affixed to said body portion such as by heat staking and operates as a cantilever.

4. The flow regulating valve of claim 1, wherein said body portion is constructed of molded plastic.

5. The flow regulating valve of claim 1, wherein said reed is constructed of metal shimstock.

6. The flow regulating valve of claim 1, wherein said land comprises a substantially concave high pressure region and a substantially concave low pressure region.

7. The flow regulating valve of claim 1, further comprising reed stop means operative to prevent substantial deflection of said reed when said valve is in a reverse flow condition.

8. The flow regulating valve of claim 1, wherein said reed is affixed to said body portion such as by heat staking and operates as a flexible beam.

9. The flow regulating valve of claim 1, wherein said low pressure region is substantially concave with respect to said reed means and said high pressure region is substantially convex with respect to said reed means.

10. The flow regulating valve of claim 1, wherein said reed means is located substantially on a plane oblique to the direction of fluid flow through said valve.

11. A fluid flow regulating valve of the type adapted for implementation within a fluid conductor such as a pipe, said valve comprising:
    a body portion including a fluid passageway therethrough parallel to the direction of fluid flow through said conductor, said passageway terminating in a contoured land integrally formed in said body portion substantially on a plane at an angle of less than 45 degrees from the direction of fluid flow, said land comprising a substantially concave low pressure region, a substantially convex high pressure region and an intermediate reed supporting region; and
    an elongated compliant cantilevered reed depending from said body portion at a point adjacent said low pressure region and disposed on a plane oblique to the direction of fluid flow through the valve, said reed overlaying said land and coacting therewith to maintain a substantially constant fluid flow rate through said said valve, said reed operative to progressively conform to the contours of said land with increasing pressure drop thereacross, said reed and low pressure region defining a first, distinct flow path therebetween, and said reed and high pressure region defining a second, distinct flow path therebetween spaced from said first flow path by the extent of said reed supporting region, a portion of said reed conforming with said low pressure region to effect substantial closure of said first flow path at a first, relatively low predetermined pressure drop level and another portion of said reed conforming with said high pressure region to effect at least partial closure of said second flow path at a second, relatively high predetermined pressure drop level.

12. The flow regulating valve of claim 11, further comprising seal means adapted to be disposed intermediate said fluid conductor and said body portion.

13. The flow regulating valve of claim 11, further comprising reed stop means operative to prevent substantial deflection of said reed when said valve is in a reverse flow condition.

14. The flow regulating valve of claim 11, wherein said body portion is constructed of molded plastic.

15. The flow regulating valve of claim 11, wherein said reed is constructed of metal shimstock.

* * * * *